(12) United States Patent
Dams et al.

(10) Patent No.: US 7,652,115 B2
(45) Date of Patent: Jan. 26, 2010

(54) FLUORINATED POLYETHER ISOCYANATE DERIVED SILANE COMPOSITIONS

(75) Inventors: Rudolf J. Dams, Antwerp (BE); Steven J. Martin, Shoreview, MN (US); Richard M. Flynn, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/657,644

(22) Filed: Sep. 8, 2003

(65) Prior Publication Data

US 2005/0054804 A1    Mar. 10, 2005

(51) Int. Cl.
*C08G 77/14* (2006.01)
*C08G 77/18* (2006.01)
*C08G 77/04* (2006.01)
*C08G 18/50* (2006.01)
*C08G 18/71* (2006.01)

(52) U.S. Cl. .................. 528/26; 428/425.5; 428/425.6; 524/165; 524/168; 524/366; 528/28; 528/29

(58) Field of Classification Search .................. 528/26, 528/28, 29; 428/425.5, 425.6; 524/165, 524/168, 366
See application file for complete search history.

(56) References Cited

U.S. PATENT DOCUMENTS

| | | | |
|---|---|---|---|
| 2,567,011 A | 9/1951 | Diesslin et al. |
| 3,250,808 A | 5/1966 | Moore, Jr. et al. |
| 3,271,341 A | 9/1966 | Garrison, Jr. |
| 3,274,244 A | 9/1966 | Mackenzie |
| 3,472,894 A | 10/1969 | Bartlett |
| 3,505,229 A | 4/1970 | Skehan |
| 3,536,710 A | 10/1970 | Bartlett |
| 3,555,089 A | 1/1971 | Bartlett |
| 3,574,770 A | 4/1971 | Paine |
| 3,621,059 A | 11/1971 | Bartlett |
| 3,644,492 A | 2/1972 | Bartlett |
| 3,646,085 A | 2/1972 | Bartlett |
| 3,683,027 A | 8/1972 | Sainesi et al. |
| 3,772,195 A | 11/1973 | Francen |
| 3,787,351 A | 1/1974 | Olson |
| 3,798,265 A | 3/1974 | Bartlett |
| 3,810,874 A | 5/1974 | Mitsch |
| 3,814,741 A | 6/1974 | Caporiccio et al. |
| 3,839,425 A | 10/1974 | Bartlett |
| 3,944,610 A | 3/1976 | Caporiccio et al. |
| 3,950,588 A | 4/1976 | McDougal |
| 4,090,967 A | 5/1978 | Falk |
| 4,099,574 A | 7/1978 | Cooper et al. |
| 4,242,516 A | 12/1980 | Mueller |
| 4,359,096 A | 11/1982 | Berger |
| 4,383,929 A | 5/1983 | Bertocchio et al. |
| 4,472,286 A | 9/1984 | Falk |
| 4,536,298 A | 8/1985 | Kamei et al. |
| 4,647,413 A | 3/1987 | Savu |
| 4,668,406 A | 5/1987 | Chang |
| 4,687,707 A | 8/1987 | Matsuo et al. |
| 4,795,764 A | 1/1989 | Alm et al. |
| 4,923,720 A | 5/1990 | Lee et al. |
| 4,975,502 A | 12/1990 | Morita et al. |
| 4,983,769 A | 1/1991 | Bertocchio et al. |
| 5,022,713 A | 6/1991 | Pugh et al. |
| 5,027,742 A | 7/1991 | Lee et al. |
| 5,066,522 A | 11/1991 | Cole et al. |
| 5,085,786 A | 2/1992 | Alm et al. |
| 5,108,799 A | 4/1992 | Hoy et al. |
| 5,130,477 A | 7/1992 | Koike et al. |
| 5,132,455 A | 7/1992 | Lagow |
| 5,211,342 A | 5/1993 | Hoy et al. |
| 5,274,159 A | 12/1993 | Pellerite et al. |
| 5,294,248 A | 3/1994 | Chittofrati et al. |
| 5,306,758 A | 4/1994 | Pellerite |
| 5,352,752 A | 10/1994 | Koike et al. |
| 5,424,438 A | 6/1995 | Chittofrati et al. |
| 5,698,138 A | 12/1997 | Visca et al. |
| 5,705,591 A | 1/1998 | Matsuda et al. |
| 5,739,369 A | 4/1998 | Matsumura et al. |
| 5,851,674 A | 12/1998 | Pellerite et al. |
| 5,863,612 A | 1/1999 | DeSimone |
| 5,910,557 A | 6/1999 | Audenaert et al. |
| 5,919,886 A | 7/1999 | Matsuda et al. |
| 5,922,787 A | 7/1999 | Kondo et al. |

(Continued)

FOREIGN PATENT DOCUMENTS

EP    0 250 767    9/1991

(Continued)

OTHER PUBLICATIONS

Milton J. Rosen, "Surfactants and Interfacial Phenomena," Second Ed., John Wiley & Sons, New York, NY, 1989, p. 1.

(Continued)

*Primary Examiner*—Rabon Sergent
(74) *Attorney, Agent, or Firm*—Kathleen B. Gross; Robert H. Jordan

(57) ABSTRACT

Described are compositions containing fluorinated polyether isocyanate derived silane compounds for treating substrates such as hard surfaces, e.g. ceramic and/or glass, to render them oil and water repellent, and stain resistant, articles having coatings comprising such compounds, and methods for applying such coatings.

21 Claims, No Drawings

U.S. PATENT DOCUMENTS

| | | | |
|---|---|---|---|
| 5,922,833 | A | 7/1999 | DeSimone |
| 6,030,663 | A | 2/2000 | McClain et al. |
| 6,127,000 | A | 10/2000 | Carbonell et al. |
| 6,160,161 | A | 12/2000 | Trabelsi et al. |
| 6,200,884 | B1 | 3/2001 | Yang et al. |
| 6,218,499 | B1 | 4/2001 | Tarumi et al. |
| 6,287,640 | B1 | 9/2001 | McClain et al. |
| 6,288,157 | B1 | 9/2001 | Jariwala et al. |
| 6,395,848 | B1 | 5/2002 | Morgan et al. |
| 6,429,258 | B1 | 8/2002 | Morgan et al. |
| 6,495,624 | B1 * | 12/2002 | Brown .................. 524/462 |
| 6,525,127 | B1 | 2/2003 | Jariwala et al. |
| 6,592,659 | B1 | 7/2003 | Terrazas et al. |
| 6,613,860 | B1 | 9/2003 | Dams et al. |
| 6,649,272 | B2 | 11/2003 | Moore et al. |
| 2002/0016267 | A1 * | 2/2002 | Scicchitano et al. ......... 508/446 |
| 2002/0192380 | A1 | 12/2002 | Elsbernd et al. |
| 2003/0113555 | A1 | 6/2003 | Pellerite et al. |
| 2003/0124361 | A1 | 7/2003 | Moore et al. |
| 2003/0138643 | A1 | 7/2003 | Moore et al. |
| 2003/0139521 | A1 | 7/2003 | Linert et al. |
| 2003/0161962 | A1 | 8/2003 | Lines et al. |
| 2003/0181572 | A1 | 9/2003 | Tan et al. |

FOREIGN PATENT DOCUMENTS

| | | |
|---|---|---|
| EP | 0 219 065 | 3/1992 |
| EP | 0 273 449 | 3/1992 |
| EP | 0 615 779 | 2/1994 |
| EP | 0 625 526 | 11/1994 |
| EP | 0 770 634 | 5/1997 |
| EP | 0 789 050 | 8/1997 |
| EP | 0 797 111 | 9/1997 |
| EP | 0 870 778 | 10/1998 |
| EP | 1 006 168 | 6/2000 |
| EP | 1 038 919 | 9/2000 |
| EP | 0 853 638 | 4/2001 |
| EP | 1 329 548 | 7/2003 |
| JP | 57-70112 | 4/1982 |
| JP | 62-238867 | 10/1987 |
| JP | 4-146917 | 5/1992 |
| JP | 10-81873 | 3/1998 |
| WO | 97/44300 | 11/1997 |
| WO | 97/45167 | 12/1997 |
| WO | WO 98/40439 | 9/1998 |
| WO | WO 99/03941 | 1/1999 |
| WO | WO 99/19080 | 4/1999 |
| WO | 99/33927 | 7/1999 |
| WO | WO 99/37720 | 7/1999 |
| WO | WO 00/27544 | 5/2000 |
| WO | WO 00/56450 | 9/2000 |
| WO | 0134670 | 5/2001 |
| WO | WO 01/30873 | 5/2001 |
| WO | WO 01/34670 * | 5/2001 |
| WO | 01/94446 | 12/2001 |
| WO | 0230848 | 4/2002 |
| WO | WO 02/30848 | 4/2002 |
| WO | 02/095121 | 11/2002 |
| WO | WO 03/040209 A1 | 5/2003 |
| WO | 03/099904 | 12/2003 |

OTHER PUBLICATIONS

Milton J. Rosen, "Surfactants and Interfacial Phenomena," Second Ed., John Wiley & Sons, New York, NY, 1989, pp. 3-4.

Fluorinated Surfactants and Repellents, Second Edition, by E. Kissa, Surfactant Science Series, vol. 97, Marcel Dekker, Inc.: New York, 2001, pp. 1- 21.

Encyclopedia of Chemical Technology, 4$^{th}$ Edition, "Supercritical Fluids", N.Y., John Wiley and Sons, vol. 23, pp. 452-477.

K.A. Nielsen, J.N. Argyropoulos, D.C. Busby, D.J. Dickson, C.S. Lee, "Enhanced Performance and Improved Economics of Supercritical Fluid Applied Coatings", pp. 151-160, Feb. 22-24, 1995, Waterborne, High-Solids, and Powder Coatings Symposium.

W.C.Bunyard, F.E. Henon, S.N. Burns, R.W. Linton, R.G. Carbonell, J.M. DeSimone, "Synthesis of Novel Perfluoropolyethers for Carbon Dioxide-Based Coatings Technologies", University of North Carolina, Dept. of Chemistry, pp. 1-10.

J. Lewis, J.N. Argyropoulos, K.A. Nielson, "Supercritical Carbon Dioxide Spray Systems", Metal Fininshing, Apr. 1997.

Annual Book of ASTM Standards, 2003, ASTM D-1331, entitled Standard Test Methods for Surface and Interfacial Tension of Solutions of Surface-Active Agents, pp. 83-85.

Test method 22-1996, published in the 2001 Technical Manual of the American Association of Textile Chemists and Colorists (AATCC), entitled "Water Repellency: Spray Test", vol. 72, 1997, pp. 62-64.

American Association of Textile Chemists and Colorists (AATCC) Standard Test Method No. 118-1983, vol. 59, 1984, entitled "Oil Repellency: Hydrocarbon Resistance Test", p. 274.

Annual Book of ASTM Standards, Part 23, 1970, ASTM D 1141-52, entitled "Standard Specifications for Substitute Ocean Water", pp. 207-209.

* cited by examiner

FLUORINATED POLYETHER ISOCYANATE DERIVED SILANE COMPOSITIONS

FIELD OF THE INVENTION

The present invention relates to a composition and method of treating substrates, in particular substrates having a hard surface such as ceramics or glass, to render them water, oil, stain, and dirt repellent. The present invention also relates to compositions for use in such a method.

BACKGROUND OF THE INVENTION

The use of fluorinated silanes, i.e., silane compounds that have one or more fluorinated groups for rendering substrates such as glass and ceramics oil and water repellent are known. For example U.S. Pat. No. 5,274,159 describes destructible fluorinated alkoxy silane surfactants that can be applied from an aqueous solution. WO 02/30848 describes compositions comprising fluorinated polyether silanes for rendering ceramics oil and water repellent.

EP 797111 discloses compositions of alkoxysilane compounds containing perfluoropolyether groups to form antifouling layers on optical components. Additionally, U.S. Pat. No. 6,200,884 discloses compositions of perfluoropolyether-modified aminosilanes that cure into films having improved water and oil repellency and anti-stain properties.

EP 789050 discloses the use of fluorinated polyether silanes for making composite film coatings. U.S. Pat. No. 3,646,085 teaches fluorinated polyether silanes for rendering glass or metal surfaces oil and water repellent. WO 99/37720 discloses fluorinated polyether silanes for providing antisoiling coating to antireflective surfaces on substrates such as glass or plastic. U.S. Pat. No. 3,950,588 discloses the use of fluorinated polyether silanes to render ceramic surfaces such as bathroom tiles or cookware water and/or oil repellent.

Although many fluorinated silane compositions are known in the art for treating substrates to render them oil and water repellent, there continues to be a desire to provide further improved compositions for the treatment of substrates, in particular substrates having a hard surface such as ceramics, glass and stone, in order to render them water and oil repellent and easy to clean There is also a need for treating glass and plastic as a hard surface, particularly in the ophthalmic field, in order to render them stain, dirt and dust resistant. Desirably, such compositions and methods employing them can yield coatings that have improved properties. In particular, it would be desirable to improve the durability of the coating, including an improved abrasion resistance of the coating. Furthermore, improving the ease of cleaning of such substrates while using less detergents, water or manual labor, is not only a desire by the end consumer, but has also a positive impact on the environment. Also, it is desired that the coatings show particularly good chemical resistance, in particular when exposed to various cleaning compositions with a pH greater than 9. The compositions can conveniently be applied in an easy and safe way and are compatible with existing manufacturing methods. Preferably, the compositions will fit easily into the manufacturing processes that are practiced to produce the substrates to be treated. The compositions preferably also avoid the use of ecologically objectionable components.

SUMMARY OF THE INVENTION

The present invention provides in one aspect a composition for treating a substrate, the composition including a mixture of: 1) a fluorinated polyether isocyanate derived silane or a mixture thereof including the reaction product of (i) a fluorinated polyether compound of the formula $$(T'_{k'}-Q')_y-R_f-Q-T_k \quad (I)$$

wherein $R_f$ is a monovalent or divalent polyfluoropolyether group; Q and Q' are independently a chemical bond, a divalent organic linking group or a trivalent organic linking group; T and T' are each —NCO or an isocyanate reactive group; k' is an integer from 0 to about 5; k is at least 2; and y is 0 or 1 and (ii) a silane compound of the formula $$T''-Q''-Si(Y_{3-x})R'_x \quad (II)$$

wherein T'' is —NCO or an isocyanate reactive group; Q'' is an organic divalent linking group; R' is an alkyl group, for example, a $C_1$-$C_4$ alkyl group, or an aryl group, such as, for example, phenyl, naphthyl, or substituted phenyl or naphthyl, wherein phenyl or naphthyl is substituted by one or more substituents such as $C_1$-$C_4$ alkyl, $C_1$-$C_4$ alkoxy, halo, nitro, and the like; Y is a hydrolyzable group; and x is 0 or 1; wherein at least one of T or T'' is —NCO; 2) an organic solvent; and, optionally, 3) a surfactant, such as a hydrocarbon, silicone or fluorinated surfactant or a mixture thereof. The term isocyanate reactive group is defined as a functional group that will react with an isocyanate group. Though not intended to be limiting, some examples of isocyanate reactive groups are: (i) alcohols, to yield urethanes, (ii) amines to yield ureas, (iii) thiols to yield thiocarbamates and (iv) carboxylic acids to yield carboxylic anhydrides or amides and the like. Particularly useful as isocyanate reactive groups are, for example, —$CO_2R^3$, where $R^3$ is hydrogen or hydroxyalkyl, —C(O)N($R^1$)($R^2$), where $R^1$ and $R^2$ are independently hydrogen, hydroxyalkyl or polyalkylenepolyamine; —OH, —SH, and NHR', where R' is as defined above.

It has been found that when a fluorinated polyether isocyanate derived silane, for example an isocyanate derived fluorinated polyether silane, as defined above, is applied from a solution containing an organic solvent, oil and water repellent coatings can be obtained that have excellent abrasion and chemical resistance and very good easy-to-clean properties, in particular when exposed to various cleaning compositions with a pH greater than 9. Furthermore, the compositions spread well on the substrate to be treated with the result that uniform properties can be achieved over the whole surface of the treated substrate.

By the term 'solution' in connection with the present invention is meant that the composition is stable, i.e., no precipitation occurs, for at least the amount of time necessary to prepare the composition and to apply it to the substrate. Generally, this means that the composition should be stable for at least one hour. Compositions of the invention were found to have generally a stability of about 1 day or even longer. The solution may be clear or can be hazy.

Advantageously, the compositions of the invention are prepared by diluting a concentrated solution of the fluorinated polyether isocyanate derived silane as defined above. For example, a concentrated solution of at least 25% by weight of a fluorinated polyether isocyanate derived silane in an organic solvent is diluted by adding to said solution additional organic solvent(s) so as to prepare a solution containing between about 0.01 and 5.0% by weight of the fluorinated polyether isocyanate derived silane.

In another aspect, the present invention also provides a method for treating a substrate, including the step of applying the composition of the invention as defined above to the substrate. Preferably, the obtained coating on the substrate is cured, generally at a temperature of about 20 to 300° C., depending on the curing catalyst chosen. The substrate may be pre-heated as to cause curing of the composition when applied, or alternatively the heating may take place simultaneously with or subsequent to the application of the composition onto the substrate.

In still another aspect, the invention provides novel fluorinated polyether isocyanate derived silanes prepared from the reaction product of a composition including a mixture of a fluorinated polyether isocyanate derived silane or a mixture thereof including the reaction product of:

(i) a fluorinated polyether compound of the formula

  (I)

wherein $R_f$ is a monovalent or divalent polyfluoropolyether group; Q and Q' is independently a chemical bond, a divalent organic linking group or a trivalent organic linking group; T and T' are —NCO or an isocyanate reactive group; k' is an integer from 0 to about 5; k is at least 2; and y is 0 or 1 and;

(ii) a silane compound of the formula

  (II)

wherein T" is each selected independently from the group consisting of —NCO, and isocyanate reactive groups; Q" is an organic divalent linking group; R' is an alkyl group or an aryl group; Y is a hydrolyzable group; and x is 0 or 1, and wherein at least one of T or T" is —NCO.

Also, the fluorochemical compositions of the present inventions are generally environmentally friendly in that compositions can be obtained that are substantially free of fluorochemical components that eliminate slowly from the body of living organisms. Moreover, it is believed that fluorochemical degradation products that may form likewise eliminate well from the body of living organisms. In particular, indications show that the fluorinated polyether compounds that have a perfluorinated polyether moiety having a molecular weight of at least 750 g/mol and perfluorinated polyether degradation products that may form therefrom would eliminate more effectively from the body of living organisms. In particular, there are indications that fluorinated polyether compounds having a fluorinated polyether moiety derivable from a polycondensation of hexafluoropropylene oxide and having a molecular weight of at least 750 g/mol would more effectively eliminate from the body of living organisms compared to long chain perfluoroaliphatic compounds having, for example, 8 perfluorinated carbons.

In still another aspect, the invention provides articles, e.g., glass or ceramic substrates having protective coatings on at least a portion of the surface thereof wherein the coatings comprise a fluorinated polyether isocyanate derived silane as described herein.

Detailed Description of Illustrative Embodiments of the Invention

The monovalent or divalent polyfluoropolyether group $R_f$ in the above formula I can include linear, branched, and/or cyclic structures, that may be saturated or unsaturated. It is a perfluorinated group (i.e., all C—H bonds are replaced by C—F bonds). In one embodiment, the perfluorinated polyether group corresponds to the formula

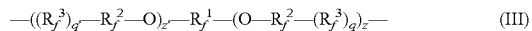  (III)

wherein $R_f^1$ is a perfluorinated alkyl or a perfluorinated alkylene group, $R_f^2$ is a perfluorinated polyalkyleneoxy group consisting of perfluorinated alkyleneoxy groups having 1, 2, 3, or 4 carbon atoms or a mixture of such perfluorinated alkyleneoxy groups; $R_f^3$ is a perfluorinated alkylene group or a substituted perfluorinated alkyl group; q and q' are independently chosen from 0 or 1; z is from 4 to 30, and z' is from 0 to 30. The perfluorinated alkyl or alkylene group $R_f^1$ in formula (II) may be linear, branched or cyclic and may contain catenary heteroatoms, such as N, O or S, and may contain 1 to 10 carbon atoms, preferably 1 to 6 carbon atoms. $R_f^2$ and $R_f^3$ are perfluorinated repeating units and combinations thereof. For example, $R_f^3$ is —$(C_nF_{2n})$— or —(CF(Z))-. $R_f^2$, for example, includes perfluorinated repeating units such as —$(C_nF_{2n}O)$—, —(CF(Z)O)—, —$(CF(Z)C_nF_{2n}O)$—, —$(C_nF_{2n}CF(Z)O)$—, —$(CF_2CF(Z)O)$—, and combinations thereof. In these repeating units Z is a perfluoroalkyl group, a substituted perfluoroalkyl group, an oxygen-substituted perfluoroalkyl group, a perfluoroalkoxy group, or an oxygen-substituted perfluoroalkoxy group, all of which can be linear branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306,758.

Typical approximate average structures for a divalent perfluoropolyether group include —$CF_2O(CF_2O)_m(C_2F_4O)_pCF_2$—, wherein an average value for m and p is 0 to 50, with the proviso that m and p are not simultaneously 0, —$CF(CF_3)O(CF(CF_3)CF_2O)_pCF(CF_3)$—, —$CF_2O(C_2F_4O)_pCF_2$—, and —$(CF_2)_3O(C_4F_8O)_p(CF_2)_3$—, wherein an average value for p is 3 to 50. Of these, particularly preferred approximate average structures are —$CF_2O(CF_2O)_m(C_2F_4O)_pCF_2$—, —$CF_2O(C_2F_4O)_nCF_2$—, and —$CF(CF_3)(OCF_2(CF_3)CF)_pO(CF_2)_mO(CF(CF_3)CF_2O)_pCF(CF_3)$—.

Typical approximate average structures for a monovalent perfluoropolyether group, $R_f$, include $CF_3CF_2O(CF_2O)_m(C_2F_4O)_pCF_2$—, $CF_3CF_2O(C_2F_4O)_pCF_2$—, $CF_3O(CF_2O)_m(C_2F_4O)_pCF_2$—, $CF_3CF_2CF_2O(CF(CF_3)CF_2O)_pCF(CF_3)$—, or combinations thereof, where an average value for m and p is 0 to 50 and m and p are not independently 0.

As synthesized, these compounds typically include a mixture of polymers. The approximate average structure is the approximate average of the mixture of polymers.

Examples of linking groups Q, Q' and/or Q" include organic groups that comprise aromatic or aliphatic groups that may be interrupted by O, N or S and that may be substituted, alkylene groups, oxy groups, thio groups, and/or carbonyl groups. Q and Q' are each independently a chemical bond or an organic divalent or trivalent linking group for example as mentioned above. In compounds of formula I, k is at least 2, T and T' are as mentioned above and each T or T' may be independently chosen, and y is 0 or 1. In accordance with a particular embodiment, the moiety -T or -T' is a moiety of the formula —CO—N($R^1$)($R^2$) where $R^1$ is for example —$CH_2CH_2OH$, —$CH_2CH_2NHCH_2CH_2NH_2$ or —$CH_2CH_2NHCH_2CH_2NHCH_2CH_2NH_2$; and $R^2$ is for example hydrogen or $R^1$.

In the above formula II, T" is a group as defined for T above. In one embodiment T" includes at least one —NCO group. When T" is not —NCO, then T includes at least one —NCO group.

The divalent linking group Q" in the above formula (II) can include linear, branched, or cyclic structures, that may be saturated or unsaturated. The group Q" can contain one or more heteroatoms (e.g., oxygen, nitrogen, or sulfur) or functional groups (e.g., carbonyl, amido, urethanylene or sulfonamido). Preferably, the divalent linking group Q" is a hydrocarbon group, preferably, a linear hydrocarbon group, optionally containing heteroatoms or functional groups. Examples of Q" groups include —$CH_2O(CH_2)_3$—, —CH$_2$OC(O)N(R)(CH$_2$)$_3$—, wherein R is H or lower alkyl group, —(C$_n$H$_{2n}$)—N(H)—C(O)O— and —(C$_n$H$_{2n}$)—, wherein n is about 2 to about 6. A preferred linking group Q" is —CH$_2$CH$_2$CH$_2$—.

Y represents a hydrolyzable group in formula (II) such as for example a halide, a C$_1$-C$_4$ alkoxy group, an acyloxy group or a polyoxyalkylene group, such as polyoxyethylene groups as disclosed in U.S. Pat. No. 5,274,159. Specific examples of hydrolysable groups include methoxy, ethoxy and propoxy groups. R' independently represents a C$_1$-C$_4$ alkyl group, such as, for example, methyl and ethyl groups.

Compounds of formula I suitable for compositions for treating substrates of the present invention have an average molecular weight (weight average) of at least about 200, and preferably, at least about 800. Preferably, they are no greater than about 10000.

The values of m and p illustrated above for the isocyanate derived fluorinated silanes can vary. Typically, an average value of m is within a range of about 1 to about 50, and an average value of p is within a range of about 4 to about 40. As these are oligomeric or polymeric materials, such compounds exist as mixtures upon synthesis, which are suitable for use. These mixtures may also contain perfluoropolyether chains bearing no functional groups (inert fluids) or more than two terminal groups (branched structures) as a consequence of the methods used in their synthesis. Typically, mixtures of oligomeric or polymeric materials containing less than about 10% by weight of nonfunctionalized polymers (e.g., those without urethane silane groups) can be used. Furthermore, mixtures of any of the individually listed compounds of formula I can be used.

As a specific example, the isocyanate component for making the fluorinated compound of the fluorochemical composition is of the formula (O)CN-Q"-SiY$_{3-x}$R$^1$$_x$ as defined above or (T$_k$-Q')$_y$-R$_f$Q-T$_k$ as defined above where T includes two to three isocyanate, (O)CN, groups.

The isocyanate compound may be aliphatic or aromatic and is conveniently a non-fluorinated compound. Generally, the molecular weight of the polyisocyanate compound will be not more than 1500 g/mol. Examples include, e.g., stearylisocyanate, phenylisocyanate, hexamethylenediisocyanate 2,2,4-trimethyl-1,6-hexamethylenediisocyanate, isophoronediisocyanate, 1,2-ethylenediisocyanate, dicyclohexylmethane-4,4'-diisocyanate, cyclic trimer of hexamethylenediisocyanate and cyclic trimer of isophorone diisocyanate (isocyanurates); aromatic polyisocyanates such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,4'-diisocyanatodibenzyl, 3,3'-dimethoxy-4,4'-diisocyanatodiphenyl, 3,3'-dimethyl-4,4'-diisocyanatodiphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Still further isocyanates that can be used for preparing the fluorinated compound include cyclic diisocyanates. Also useful are isocyanates containing internal isocyanate-derived moieties such as azetedinedione-containing diisocyanates such as that available from Bayer as DESMODUR™ TT. Also, other di- or tri-isocyanates such as those available from Bayer as DESMODUR™ L, DESMODUR™ N, and DESMODUR™ W, tri-(4-isocyanatophenyl)-methane (available from Bayer as DESMODUR™ R) and DDI 1410 (available from Henkel) are suitable. The diisocyanates can be condensed first with the fluorinated moiety (for example polyether dialcohols) or with the appropriate alkoxy silane (for example, aminoalkylalkoxysilanes, such as aminopropyltrimethoxysilane or aminopropyltriethoxysilane, or mercaptoalkylsilanes, such as mercaptopropyltriethoxysilane).

The perfluoropolyether isocyanate derived silanes can be prepared using standard techniques. Generally, one or more compounds of formula I are reacted with one or more compounds of formula II. For example, commercially available or readily synthesized perfluoropolyether diols can be combined with an isocyanate alkoxysilane, such as 3-(triethoxysilyl) propyl isocyanate, commercially available from Aldrich Chemicals, Milwaukee, Wis., by known methods, which are described in the Examples. Such materials may or may not need to be purified before use in a treatment composition.

Alternatively the perfluoropolyether isocyanate derived silanes can be synthesized by first reacting one or more isocyanate-containing compounds of formula I with isocyanate-reactive material(s), followed by condensation of the residual isocyanate groups with reagents containing a silane functionality and having an isocyanate reactive group, for example aminopropyltriethoxysilane or mercaptopropyltriethoxysilane.

Compounds according to formula (I) can for example be obtained by oligomerization of hexafluoropropylene oxide which results in a perfluoropolyether carbonyl fluoride. This carbonyl fluoride may be converted into an acid, acid salt, ester, amide or alcohol by reactions well known to those skilled in the art. The carbonyl fluoride or acid, ester or alcohol derived therefrom may then be reacted further to introduce the desired reactive groups according to known procedures. For example, EP 870 778 describes suitable methods to produce compounds according to formula (I) having desired moieties -Q-T$_k$. Compounds having the moiety —CON(R$_1$)(CH$_2$)$_n$OH listed above can be obtained by reacting the methyl ester derivative of a fluorinated polyether with an amino-alcohol. For example 2-aminoethanol would yield a compound having the moiety —CONHCH$_2$CH$_2$OH. In the same manner, the methyl ester of a fluorinated polyether may be reacted with diethylene triamine or triethylene tetramine to form moieties —CONHCH$_2$CH$_2$NHCH$_2$CH$_2$NH$_2$ and —CONHCH$_2$CH$_2$NHCH$_2$CH$_2$NH—CH$_2$CH$_2$NH$_2$ respectively.

Still further examples of compounds according to above formula (I) are disclosed in EP 870 778 or U.S. Pat. No. 3,536,710.

A composition of the present invention includes one or more organic solvents. The organic solvent or blend of organic solvents preferred must be capable of dissolving at least 0.01% of the fluorinated polyether isocyanate derived silane as defined above. In addition, the organic solvent renders the surfactant(s) and the fluorinated silane(s) compatible (in case they are not compatible in the absence of the organic solvent), and lowers the viscosity of the dilutable, non-aqueous concentrate. Suitable organic solvents, or mixtures of solvents are polar organic solvents and can include aliphatic alcohols, such as methanol, ethanol, isopropyl alcohol; ketones such as acetone or methyl ethyl ketone; esters, such as ethyl acetate, methylformate and ethers, such as diisopropyl ether, 1,4-dioxane, and diethylene glycol dimethyl ether; and amides, such as N-methylpyrrolidinone, and N,N-dimethylformamide and mixtures thereof. Fluorinated solvents such as, for example, heptafluorobutanol, trifluoroethanol and hexafluoroisopropanol, may be used alone or in combination with other non-fluorine containing organic solvents in order to improve solubility of the fluorinated polyether isocyanate derived silane.

Preferred organic solvents are aliphatic alcohols. Some examples of preferred aliphatic alcohols are ethanol, and isopropyl alcohol.

Preferably, the organic solvent is water miscible. Also, preferably, the organic solvent has a boiling point that is below 200° C.

Optionally the composition of this invention may also include surfactants to make the composition water soluble or water dispersible.

A surfactant is defined as "a substance that, when present at low concentration in a system, has the property of adsorbing onto the surfaces or interfaces of the system and of altering to a marked degree the surface or interfacial free energies of these surfaces." (Milton J. Rosen, "Surfactants and Interfacial Phenomena," Second Ed., John Wiley & Sons, New York, N.Y., 1989, page 1). These surfactants have "a characteristic molecular structure consisting of a structural group that has very little attraction for [a] solvent, known as a lyophobic group, together with a group that has a strong attraction for [a] solvent, called the lyophilic group . . . " (Milton J. Rosen, "Surfactants and Interfacial Phenomena," Second Ed., John Wiley & Sons, New York, N.Y., 1989, pages 3-4). When the solvent is aqueous, the lyophobic group is typically a nonpolar group such as alkyl or fluorinated alkyl, while the lyophilic group is a polar group.

The term "fluorinated" (as in the term fluorinated surfactant) indicates that at least about 75 percent, preferably at least about 85 percent, more preferably at least about 95 percent, of the hydrogen atoms of the alkyl moiety are replaced by fluorine atoms. Optionally, remaining hydrogen atoms can be replaced by other halogen atoms, such as by chlorine atoms.

The fluorinated surfactant acts to stabilize an emulsion (that is, droplets of one liquid phase dispersed in another liquid phase) or dispersion, and can aid in solubility or compatibility of the fluorinated silane(s) and the organic cosolvent(s) (if there is one or more organic cosolvent(s)) of the dilutable, non-aqueous concentrate.

Fluorinated surfactants useful in this invention are amphiphilic materials, comprising one or more hydrophobic fluorochemical segments and one or more solubilizing and hydrophilic segments. Such materials are described in "Fluorinated Surfactants and Repellents", Second Edition, by E. Kissa, Surfactant Science Series, Volume 97, Marcel Dekker, Inc.: New York, 2001 pp 1-21. The fluorinated surfactants have a fluorine content by weight of at least 10%. These fluorinated surfactants can be monomeric or polymeric, with molecular weights between about 300 and about 100,000 grams per mole, preferably between about 400 and about 20,000 grams per mole. The hydrophobic fluorochemical groups can be, for instance, perfluoroalkyl containing between about 3 and about 20 carbon atoms (with those containing 4 carbon atoms typically being preferred for an optimum combination of performance and environmental properties), or a mono- or divalent perfluoropolyether group with molecular weight between about 300 and about 10,000 grams per mole. Hydrophilic groups on the fluorinated surfactants can be of anionic (such as carboxylate), cationic (such as quaternary ammonium), nonionic (such as oligo (oxyethylene)) or amphoteric (such as amine oxide) nature as long as they do not contain functionalities that cause instability in the concentrates of this invention, for example strongly acidic groups, strongly basic groups, or contamination by fluoride ions.

Representative fluorinated surfactants include, but are not limited to, the following:

$C_7F_{15}CO_2^- NH_4^+$ $C_8F_{17}SO_2N(C_2H_5)(C_2H_4O)_7CH_3$ $C_8F_{17}(C_2H_4O)_{10}H$ $(C_4F_9SO_2)_2N^- NH_4^+$ $C_4F_9SO_2N(CH_3)(C_2H_4O)_nCH_3$ (where $n_{avg}$~7)

$C_3F_7O(CF(CF_3)CF_2O)_nCF(CF_3)CO_2^- NH_4^+$ (where $n_{avg}$~13)

Examples of these and other fluorinated surfactants of the present invention are described, for example, in U.S. Pat. No. 3,772,195 (Francen), U.S. Pat. No. 4,090,967 (Falk), U.S. Pat. No. 4,099,574 (Cooper et al.), U.S. Pat. No. 4,242,516 (Mueller), U.S. Pat. No. 4,359,096 (Berger), U.S. Pat. No. 4,383,929 (Bertocchio et al.), U.S. Pat. No. 4,472,286 (Falk), U.S. Pat. No. 4,536,298 (Kamei et al.), U.S. Pat. No. 4,795,764 (Alm et al.), U.S. Pat. No. 4,983,769 (Bertocchio et al.) and U.S. Pat. No. 5,085,786 (Alm et al.), which are herein incorporated by reference. Some of these fluorinated surfactants are commercially available from Minnesota Mining and Manufacturing Company (St. Paul, Minn.), having the tradename FLUORAD™, or commercially available from E.I. DuPont de Nemours and Co. (Wilmington, Del.), having the tradename ZONYL™.

Polymeric fluorinated surfactants can also be used in the present invention. Examples of polymeric fluorinated surfactants that may be used in the present invention are found in U.S. Pat. No. 3,787,351 (Olson), U.S. Pat. No. 4,668,406, and PCT International App. WO 01/30873, which are incorporated herein by reference.

Examples of polymeric fluorinated surfactants that may be used include random copolymer fluorinated surfactants. Examples of random copolymer fluorinated surfactants include the following structures:

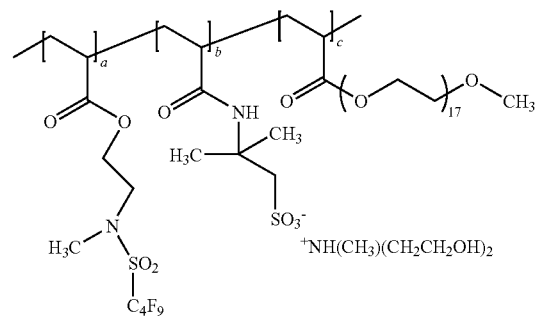

wherein the molar ratio of a:b:c is about 30:about 1:about 32, and wherein the molecular weight of the surfactant is about 1,000 to about 4,000 grams per mole; and

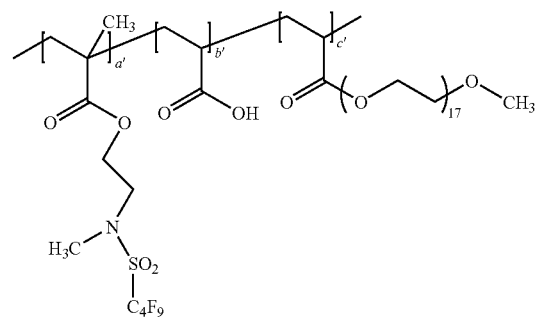

wherein the molar ratio of a':b':c' is about 3:about 3:about 1, and wherein the molecular weight of the surfactant is about 2,000 to about 40,000 grams per mole.

The surfactant may also be a hydrocarbon or silicone surfactant which is not reactive with the isocyanate derived silane. The hydrocarbon surfactant may be a cosurfactant with a fluorinated surfactant above defined. Typically a hydrocarbon surfactant includes, for example nonionic surfactants, such as Triton™ X-305, Surfynol™ 465 or Tween™ 80, cationic surfactants such as Arquad™ 2C-75 and anionic surfactants such as Witcolate™ 4085.

The surfactant or mixture of surfactants is generally included in the concentrate in an amount up to about 50 wt %, preferably up to about 30 wt %, Suitable substrates that can be treated in a particularly effective way with the fluorinated polyether isocyanate derived silane mixture of this invention include substrates having a hard surface preferably with functional groups capable of reacting with the isocyanate derived fluorinated silane of the invention. Preferably, such reactivity of the surface of the substrate is provided by active hydrogen atoms. When such active hydrogen atoms are not present, the substrate may first be treated in a plasma containing oxygen or in a corona atmosphere or be treated with a primer, such as a $SiO_2$-layer, to make it reactive to the fluorinated polyether silane.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

Preferably, the substrate should be cleaned prior to applying the compositions of the invention so as to obtain optimum characteristics, particularly durability. That is, the surface of the substrate to be coated should be substantially free of organic and inorganic contamination prior to coating. Cleaning techniques depend on the type of substrate and include, for example, a solvent washing step with an organic solvent, such as acetone or ethanol, or a reactive gas-phase treatment such as UV/ozone.

Useful substrates include ceramics, glazed ceramics, glass, metals (such as aluminum, iron, stainless steel, copper and the like), natural and man-made stone, thermoplastic materials (such as poly(meth)acrylate, polycarbonate, polystyrene, styrene copolymers such as styrene/acrylonitrile copolymers, and polyesters such as polyethylene terephthalate), and wood. Additionally compositions of the invention may also be added to paints (such as those based on acrylic resins), and powder coatings (such as polyurethane, epoxy or hybrid powder coatings) for application to substrates listed above.

Particularly preferred substrates include those siliceous substrates including ceramics, glazed ceramics, glass, concrete, mortar, grout and natural and man-made stone. Various articles can be effectively treated with the fluorochemical solution of the present invention to provide a water and oil repellent coating thereon. Examples include ceramic tiles, bathtubs or toilets, glass shower panels, construction glass, various parts of a vehicle (such as the mirror or windscreen), and ceramic or enamel pottery materials. Treatment of glass employed for ophthalmic purposes, e.g., glass lenses, with the composition of the present invention is especially advantageous.

Another preferred substrate is an antireflective substrate. Antireflective (AR) surfaces are substrates prepared by vacuum sputtering of metal oxide thin films on substrates made of glass or plastic are particularly useful in ophthalmic devices and display devices of electronic equipment. Such metal oxide films are relatively porous and consist of clusters of particles forming a relatively rough profile. Such coatings help reduce glare and reflection. When they are used in ophthalmic eyewear they reduce eyestrain. When they are conductive coatings, they also help reduce static discharge and electromagnetic emissions. Thus, one application for these coatings is to provide contrast enhancement and antireflective properties to improve the readability of display devices, such as computer monitors. Antireflective substrates are described in U.S. Pat. No. 5,851,674 incorporated by reference herein in its entirety.

Sputtered metal oxide antireflective coatings are generally durable and uniform. Also, their optical properties are controllable, which makes them very desirable. They also have very high surface energies and refractive indices. However, the high surface energy of a sputtered metal oxide surface makes it prone to contamination by organic impurities (such as skin oils). The presence of surface contaminants results in a major degradation of antireflectivity properties of the metal oxide coatings. Furthermore, because of the high refractive indices, surface contamination becomes extremely noticeable to the end-user.

The present invention provides a protective coating on an antireflective surface that is relatively durable, and more resistant to contamination and easier to clean than the antireflective surface itself. The present invention provides in one embodiment a method and composition for use in preparing an antireflective article comprising a substrate having an antireflective surface and an antisoiling coating of less than about 200 Angstroms thick deposited thereon. The antisoiling coating comprises a fluorinated isocyanate derived siloxane film of a thickness that does not substantially change the antireflective characteristics of the antireflective article.

Preferably, the overall coating thickness of the antisoiling coating is greater than a monolayer (which is typically greater than about 15 Angstroms thick). That is, preferably, an antisoiling coating of the present invention is at least about 20 Angstroms thick, and more preferably, at least about 30 Angstroms thick. Preferably, it is less than about 200 Angstroms thick, and more preferably, less than about 100 Angstroms thick. The coating material is typically present in an amount that does not substantially change the antireflective characteristics of the antireflective article.

The coating composition is typically a relatively dilute solution, containing between 0.01 and 5 percent by weight inclusive of the fluorinated polyether isocyanate derived silane, more preferably, between 0.01 and 3 percent by weight inclusive of the fluorinated polyether isocyanate derived silane, and most preferably, between 0.02 and 0.2 percent by weight inclusive of the silane.

For ease of manufacturing and for reasons of cost, the compositions of the present invention can be prepared shortly before use by diluting a concentrate of one or more of the fluorinated polyether isocyanate derived silanes. The concentrate will generally comprise a concentrated solution of the fluorinated polyether isocyanate derived silane in an organic solvent. The concentrate should be stable for several weeks, preferably at least 1 month, more preferably at least 3 months. It has been found that the fluorinated polyether isocyanate derived silane can be readily dissolved in an organic solvent at high concentrations. In particular, it was found that at amounts of at least 25% by weight, it becomes easier to dissolve the fluorinated compound of this invention in an organic solvent and obtain concentrated solutions that are generally clear and stable over a long period. This is surprising as only turbid solutions of limited stability may be obtained at low concentration, whereas at high concentration in the same organic solvent, clear solutions with high stability may be obtained. For example, at room temperature, stable clear solutions can be obtained in ketones and alcohols such as acetone, methyl ethyl ketone, methyl isobutyl ketone, ethanol and isopropanol, fluorinated solvents such as hydrofluorocarbons at concentration of at least 10% by weight of the fluorinated polyether isocyanate derived silane, whereas at a concentration of only 0.1% in non-halogenated organic solvents, the solution tends to be hazy and of limited stability. On the other hand in hydrofluoroethers, a fluorinated solvent, solutions containing 0.1% or more of the fluorinated polyether isocyanate derived silane, were clear.

In a preferred embodiment of the present invention, the fluorochemical composition will be free of or substantially free of perfluorinated polyether moieties having a molecular weight of less than 750 g/mol and/or perfluoroaliphatic groups of more than 5 or 6 carbons. By the term "perfluoroaliphatic groups" is meant groups consisting of carbon and fluorine without including perfluorinated end groups of the perfluorinated polyether moieties. By the term "substantially free of" is meant that the particular perfluorinated polyether moieties are present in amounts of not more than 10% by weight, preferably not more than 5% by weight and most preferably not more than 1% by weight based on the total weight of perfluorinated polyether moieties in the composition and that the particular perfluoroaliphatic groups having more than 5 or 6 carbons are present in amounts of not more than 10% by weight, preferably not more than 5% by weight and most preferably not more than 1% by weight based on the total weight of perfluoroaliphatic groups in the composition. Compositions that are free of or substantially free of these moieties or groups are preferred because of their beneficial environmental properties.

Thus, in accordance with a preferred embodiment, compositions for application to a substrate are prepared by diluting a concentrate comprising a solution of at least 10% by weight of a fluorinated polyether compound in an organic solvent, by adding to the concentrate an organic solvent or mixture of solvents. A thus freshly prepared diluted solution will generally be stable for about 1 day. A wide variety of coating methods can be used to apply a composition of the present invention, such as brushing, spraying, dipping, rolling, spreading, and the like. Additionally, these materials can be applied using super critical fluids such as compressed fluid carbon dioxide, as described in U.S. patent application Ser. No. 09/838,415, filed Apr. 19, 2001.

A preferred coating method for application of a fluorinated polyether isocyanate derived silane of the present invention includes spray application. A substrate to be coated can typically be contacted with the treating composition at room temperature (typically, about 20° C. to about 25° C.). Alternatively, the mixture can be applied to substrates that are preheated at a temperature of for example between 60° C. and 150° C. This is of particular interest for industrial production, where e.g. ceramic tiles can be treated immediately after the baking oven at the end of the production line. Following application, the treated substrate can be dried and cured at ambient or elevated temperature, e.g. at 40° to 300° C. and for a time sufficient to dry. The process may also require a polishing step to remove excess material.

Glossary

| Designator | Name, Structure and/or Formula | Availability |
|---|---|---|
| aminoethanol | $NH_2CH_2CH_2OH$ | Sigma-Aldrich Milwaukee, WI |
| APD | 2-amino-1,3-propanediol; $HOCH_2CH(NH_2)CH_2OH$ | Sigma-Aldrich |
| APTES | Aminopropyltriethoxysilane $NH_2(CH2)_3Si(OCH_2CH_3)_3$ | Sigma-Aldrich |
| chloropropylsilane | $Cl(CH_2)_3Si(OCH_3)_3$ | Sigma-AldrichS |
| DESMODUR ™ N 100 | Polyfunctional isocyanate resin with an average of ~3.5 NCO-groups per molecule | Bayer, Pittsburgh. PA |
| DBTDL | dibutyltin dilaurate; $[CH_3(CH_2)_{10}CO_2]_2Sn[(CH_2)_3CH_3]_2$ | Sigma-Aldrich |
| DETA | diethylenetriamine; $NH_2CH_2CH_2NHCH_2CH_2NH_2$ | Sigma-Aldrich |
| FS-1 | Fluorinated surfactant | As prepared in WO 01/30873 A1; Example 4 |
| FOMBLIN Z-DEAL ™ | $CH_3OC(O)CF_2(CF_2O)_n(CF_2CF_2O)_mCF_2C(O)OCH_3$; where $n_{avg}$, $m_{avg}$ = ~10-12 | Ausimont, Thorofare, NJ |
| HPFO-oligomeric ester | $CF_3CF_2CF_2(CF(CF_3)CF_2O)_nCF(CF_3)COOCH_3$; where n = 3 to 20; $MW_{avg}$ ~1232 | 3M, St Paul, MN |
| MPTMS | 3-mercaptopropyltrimethoxysilane; $HS(CH_2)_3Si(OCH_3)_3$ | Sigma-Aldrich |
| NCO-silane | 3-(triethoxysilyl)propyl isocyanate; $OCN(CH_2)_3Si(OC_2H_5)_3$ | Sigma-Aldrich |
| octadecanol | $CH_3(CH_2)_{17}OH$ | Sigma-Aldrich |
| Sodium borohydride | $NaBH_4$ | Sigma-Aldrich |
| TEGME | tri(ethyleneglycol) monomethyl ether; $CH_3(OCH_2CH_2)_3OH$ | Sigma-Aldrich |
| THE | tin(II) 2-ethylhexanoate; $[CH_3(CH_2)_3CH(C_2H_5)CO_2]_2Sn$ | Sigma-Aldrich |
| TETA | triethylenetetraamine; $NH_2CH_2CH_2NHCH_2CH_2NHCH_2CH_2NH_2$ | Sigma-Aldrich |

-continued

Glossary

| Designator | Name, Structure and/or Formula | Availability |
|---|---|---|
| TFSD | tetrafluorosuccinyl difluoride; FOCCF$_2$CF$_2$COF | 3M |

Sample Preparation and Test Methods

Coating Method

In a first step, the substrates (white sanitary tiles available from Sphinx, Netherlands) were cleaned and degreased with acetone. After cleaning, fluorinated polyether silanes in solvent mixtures as given in the respective examples were applied onto the substrates by spray application at about 20 ml/minute. The substrates were kept at room temperature before coating. Alternatively, the substrates were preheated before coating. Coated samples were dried at room temperature or forced-air oven dried at 120° C. for 30 minutes. Afterwards, excess product was removed using a dry cloth.

Abrasion/Scrub Method

Abrasion testing was accomplished using an Erichsen cleaning machine (available from DCI, Belgium), 3M™ HIGH PERFORMANCE™ Cloth (available from 3M Co., St. Paul, Minn.) and CIF™ cream cleaner (available from Lever Faberge, France), using 40 cycles.

Base Treatment

White sanitary (tiles available from Sphinx, Netherlands), coated as described above, were subjected to basic pH conditions using the following method. A stainless steel ring (7.6 cm diameter) was affixed to the glazed surface of the sanitary tiles using epoxy, and a 15 mL aliquot of NaOH (5% aqueous solution) was charged to the ring. After 24 hours the base solution was removed, the tile liberally rinsed with deionized water and contact angle measurements were made at the tile surface which was in contact with the base solution.

Contact Angle Measurement

The treated substrates were tested for their contact angles versus water (W) and n-hexadecane (O) using an Olympus TGHM goniometer (Olympus Corp, Pompano Beach Fl). The contact angles were measured before (initial) and after abrasion (abrasion), unless otherwise indicated. Contact angles with water and hexadecane were measured at least 24 hrs after application or after abrasion. The values are the mean values of 4 measurements and are reported in degrees. The minimum measurable value for a contact angle was 20. A value <20 means that the liquid spreads on the surface.

EXAMPLES

Preparation 1. HFPO/Succinyl Fluoride Oligomeric Ester (HFPO-SF)

Can be prepared essentially according to U.S. Pat. No. 4,647,413, Examples 1 and 9.

Example 1

Preparation of FOMBLIN Z-DEAL™/APD/NCO-Silane; 1/2/4

A three necked 100 mL round bottom flask fitted with a stirrer, heating mantle, thermometer and condenser, was charged with FOMBLIN Z-DEAL™ (19.6 g; 0.01 mole) and APD (1.8 g; 0.02 mole). Reaction was done under nitrogen. The temperature of the mixture was elevated to 40° C. and held for 4 hrs. NCO-silane (9.9 g; 0.04 mole) was then added along with one drop of TEH (about 0.05 g) and the resulting mixture was heated overnight at 80° C. The reaction was checked for residual isocyanate using standard IR techniques. A viscous liquid was obtained, and this viscous liquid (0.1 g) was then diluted with ethanol (95.4 g), water (3.0 g) and acetic acid (1.5 g) prior to application.

Example 2

Preparation of FOMBLIN Z-DEAL™/TETA/NCO-Silane: 1/2/6

A three necked 100 mL round bottom flask fitted with a stirrer, heating mantle, thermometer and condenser, was charged with FOMBLIN Z-DEAL™ (19.6 g; 0.01 mole) and TETA (2.9 g; 0.02 mole). Reaction was done under nitrogen. The temperature of the mixture was elevated to 40° C. and held for 4 hrs. NCO-silane (14.8 g; 0.06 mole) was then added and the resulting mixture was heated overnight at 40° C. The reaction was checked for residual isocyanate using standard IR techniques. A viscous liquid was obtained, and this viscous liquid (0.1 g) was then diluted with ethanol (95.4 g), water (3.0 g) and acetic acid (1.5 g) prior to application.

Example 3

Preparation of HFPO-Oligomeric Ester/APD/NCO-Silane; 1/1/2

A three necked 100 mL round bottom flask fitted with a stirrer, heating mantle, thermometer and condenser, was charged with HFPO-oligomeric diester (12.3 g; 0.01 mole) and APD (0.9 g; 0.01 mole). Reaction was done under nitrogen. The temperature of the mixture was elevated to 40° C. and held for 16 hrs. NCO-silane (5.0 g; 0.02 mole) was then added along with one drop of TEH (about 0.05 g) and the resulting mixture was heated overnight at 80° C. The reaction was checked for residual isocyanate using standard IR techniques. A viscous liquid was obtained, and this viscous liquid (0.1 g) was then diluted with ethanol (95.4 g), water (3.0 g) and acetic acid (1.5 g) prior to application.

Example 4

Preparation of HFPO-Oligomeric Ester/DETA/NCO-Silane; 1/1/2

A three necked 100 mL round bottom flask fitted with a stirrer, heating mantle, thermometer and condenser, was charged with HFPO-oligomeric ester (12.3 g; 0.01 mole) and DETA (11 mole). Reaction was done under nitrogen. The temperature of the mixture was elevated to 40° C. and held for 16 hrs. NCO-silane (5.0 g; 0.02 mole) was then added and the resulting mixture was heated overnight at 40° C. The reaction was checked for residual isocyanate using standard IR techniques. A viscous liquid was obtained, and this viscous liquid (0.1 g) was then diluted with ethanol (95.4 g), water (3.0 g) and acetic acid (1.5 g) prior to application.

Example 5

Preparation of HFPO-Oligomeric Ester/TETA/NCO-Silane; 1/1/3

A three necked 100 mL round bottom flask fitted with a stirrer, heating mantle, thermometer and condenser, was charged with HFPO-oligomeric ester (12.3 g; 0.01 mole) and TETA (1.5 g; 0.01 mole). Reaction was done under nitrogen. The temperature of the mixture was elevated to 40° C. and held for 4 hrs. NCO-silane (7.4 g; 0.03 mole) was then added and the resulting mixture was heated overnight at 40° C. The reaction was checked for residual isocyanate using standard IR techniques. A viscous liquid was obtained, and this viscous liquid (0.1 g) was then diluted with ethanol (95.4 g), water (3.0 g) and acetic acid (1.5 g) prior to application.

Example 6

Preparation of HFPO-Oligomeric Ester/TETA/NCO-Silane; 2/1/2

A three necked 100 mL round bottom flask fitted with a stirrer, heating mantle, thermometer and condenser, was charged with HFPOSF (24.6 g; 0.02 mole) and TETA (1.5 g; 0.01 mole). Reaction was done under nitrogen. The temperature of the mixture was elevated to 40° C. and held for 4 hrs. NCO-silane (5.0 g; 0.02 mole) was then added and the resulting mixture was heated overnight at 40° C. The reaction was checked for residual isocyanate using standard IR techniques. A viscous liquid was obtained, and this viscous liquid (0.1 g) was then diluted with ethanol (95.4 g), water (3.0 g) and acetic acid (1.5 g) prior to application.

Example 7

Preparation of HFPO-SF/APD/NOC-Silane; 1/2/4

The procedure described in Example 3 was followed replacing HFPO-oligomeric ester with and equimolar amount of HFPO-SF diester as described in Preparation 1 and appropriate amounts of other materials to achieve the 1/2/4 molar ratio.

Example 8

Preparation of HFPO-SF/DETA/NCO-Silane; 1/2/6

The procedure described in Example 4 was followed replacing HFPO-oligomeric ester with an equimolar amount of HFPO-SF as described in Preparation 1 and appropriate amounts of other materials to achieve a 1/2/6 molar ratio.

Example 9

Preparation of HFPO-Oligomeric Ester/TETA/NCO-Silane/Chloropropylsilane, 1/1/2/1

The procedure described in Example 5 was followed substituting a combination of NCO-silane (5.0 g; 0.02 mole) and chloropropylsilane (2.0 g; 0.01 mole) for NCO-silane.

Example 10

Preparation of Fomblin Z DEAL™/Aminoethanol/DESMODUR™ N-100/APTES; 1/2/2/4

A three necked 100 ml flask equipped with a stirrer, heating mantle, thermometer and condenser, was charged with Fomblin Z-DEAL™ (19.6 g; 0.01 mol) and aminoethanol (1.4 g; 0.02 mole), and heated at 40° C. under nitrogen for 4 hrs. To this mixture was added methylethylketone (30.0 g), DESMODUR™ N-100 (6.6 g 0.02 mole) and one drop of TEH (about 0.05 g). The ensuing mixture was heated overnight at about 80° C. under nitrogen. The reaction was then cooled to about 30° C. and APTES (7.2 g; 0.04 mole) was added and heated to about 40° C. for 2 hrs. A viscous liquid was obtained, and this viscous liquid (0.1 g) was then diluted with ethanol (95.4 g), water (3.0 g) and acetic acid (1.5 g) prior to application.

Example 11

Preparation of Fomblin Z-DEAL™/Aminoethanol/ N-100/APTES/Octadecanol; 1/2/2/3/1

The procedure described in Example 10 was followed substituting APTES (5.4 g; 0.03 mole), and octadecanol (2.7 g; 0.01 mole) for APTES.

Example 12

Preparation of HFPO-oligomeric ester/Aminoethanol/N-100/Aminopropylsilane/1/1/1/2

A three necked 100 ml flask, equipped with a stirrer, condenser and thermometer was charged with HFPO-oligomeric ester (12.3 g; 0.01 mol) and aminoethanol (0.7 g; 0.01 mole). The mixture was reacted for 4 hrs at 60° C. under nitrogen; then DESMODUR™ N-100 (3.3 g; 0.01 mole), methylethylketone (30 g) and one drop of TEH (about 0.05 g). The mixture was heated at 80° C. overnight under nitrogen. The ensuing mixture was cooled to 40° C. and APTES (3.5 g; 0.02 mole) was added and further reacted for 4 hrs at 40° C. Reaction was checked for residual isocyanate. A viscous liquid was obtained, and this viscous liquid (0.1 g) was then diluted with ethanol (95.4 g), water (3.0 g) and acetic acid (1.5 g) prior to application.

Example 13

Preparation of HFPO-Ester/Aminoethanol/N-100/MPTMS; 1/1/1/2

The procedure described in Example 12 was followed substituting MPTMS (4.0 g; 0.02 mole) for APTES.

Example 14

Preparation of HFPO-Oligomeric Ester/TETA/NOC-Silane—TEGME, 1/1/3 and Alkoxy Exchange with TEGME The procedure described in Example 5 was followed with the exception that after checking for residual isocyanate, TEGME (42.4 g) was added to the reaction mixture, a Dean-Stark trap was set up and the mixture was heated for 2 hours at 120° C. and 3 hrs at 140° C. A clear, slightly brown liquid was obtained; an aliquot of this liquid (0.1 g) was diluted in ethanol (95.4 g), water (3.0 g) and 1.5 g acetic acid (1.5 g) prior to application.

Example 15

Preparation of a Water Dilutable Concentrate using FS-1

The product prepared under Example 3 (3.0 g), was mixed with FS-1 (1.0 g) and isopropanol (12.0 g) in a 30 ml glass vial under shaking. A clear solution resulted, which was diluted to 0.1% in ethanol (100.0 g), water (3.0 g) and acetic acid (1.5 g) prior to application.

Comparative Example C1

Comparative Example C1 was prepared according to the procedure described in WO 02/30848, Example 50.

Comparative Example C2

Untreated tile.

The invention claimed is:

1. A composition comprising a mixture of:
  (a) a perfluoropolyether urethane or urea silane or a mixture thereof comprising the reaction product of:
    (i) a fluorinated polyether compound of the formula $$(T')_y\text{-}R_f\text{-}T \qquad (I)$$

wherein $R_f$ is a monovalent or divalent polyfluoropolyether group; T and T' each independently represent —$CO_2R^3$, where $R^3$ is hydroxyalkyl, or —C(O)N($R^1$)($R^2$), where $R^1$ is hydroxyalkyl, dihydroxypropyl, or polyalkylenepolyamine and $R^2$ is hydrogen or $R^1$; and y is 0 or 1; and
    (ii) a silane compound of the formula $$T''\text{-}Q''\text{-}SiY_{3-x}R'_x \qquad (II)$$

wherein T" is —NCO; Q" is —$(C_nH_{2n})$—, where n is 2 to 6; R' is an alkyl group of 1-4 carbon atoms; Y is a $C_1$-$C_4$ alkoxy group, a halide, an acyloxy group, or a polyoxyalkylene group; and x is 0 or 1; and
  (b) an organic solvent.

| Example | Material | Initial Water Contact Angle (°) (hexadecane) | Post-abrasion Water Contact Angle (°) (hexadecane) | Post-base treatment Water Contact Angle (°) (hexadecane) |
|---|---|---|---|---|
| 1 | Z-Deal/APD/NCO-silane 1/2/4 | 100 (65) | 85 (53) | 92 (56) |
| 2 | Z-Deal/TETA/NCO-silane 1/2/6 | 105 (63) | 83 (51) | 90 (58) |
| 3 | HFPO-ester/AMPD/NCO-silane 1/1/2 | 112 (72) | 80 (50) | 95 (62) |
| 4 | HFPO-ester/DETA/NCO-silane 1/1/2 | 111 (68) | 82 (52) | 97 (56) |
| 5 | HFPO-ester/TETA/NCO-silane 1/1/3 | 106 (69) | 80 (48) | 92 (55) |
| 6 | HFPO-ester/TETA/NCO-silane 2/1/2 | 114 (72) | 84 (53) | 95 (60) |
| 7 | HFPO-SF diester/APD/NCO-silane | 108 (67) | 86 (55) | 90 (55) |
| 8 | HFPO-SF diester/DETA/NCO-silane | 105 (65) | 84 (53) | 90 (56) |
| 9 | HFPO-oligomeric ester/TETA/NCO-silane/chloropropylsilane | 105 (63) | 78 (48) | 83 (50) |
| 10 | Fomblin Z DEALTM/Aminoethanol/DESMODUR TM N-100/APTES | 110 (65) | 85 (53) | — |
| 11 | Fomblin Z-DEALTM/Aminoethanol/DESMODURTM N-100/APTES/Octadecanol | 108 (63) | 90 (50) | — |
| 12 | HFPO-oligomeric ester/Aminoethanol/N-100/APTES | 105 (69) | 82 (52) | 90 (54) |
| 13 | HFPO-oligomeric ester/aminoethanol/N-100/MPTMS | 112 (71) | 83 (55) | 90 (54) |
| 14 | HFPO-oligomeric ester/TETA/NCO-silane/TEGME | 103 (65) | 85 (50) | 88 (54) |
| 15 | Example 3/FC-4430/IPA = 3/1/12 | 107 (70) | 83 (55) | 85 (52) |
| C1 | See WO 02/30848; Ex. 50 | 105 (64) | 88 (57) | 61 (38) |
| C2 | untreated | 35 (<20) | 25 (<20) — | 22 (<20) — |

2. The composition according to claim 1 wherein T and T' each independently represent —C(O)N(R¹)(R²), where R¹ is hydroxyalkyl, dihydroxypropyl, or polyalkylenepolyamine, and R² is hydrogen.

3. The composition according to claim 1 wherein R¹ is hydroxyalkyl, dihydroxypropyl, or polyalkylenepolyamine, and R² is hydrogen.

4. A composition according to claim 1, further comprising a fluorosurfactant.

5. A composition according to claim 4, wherein the fluorosurfactant has the structure

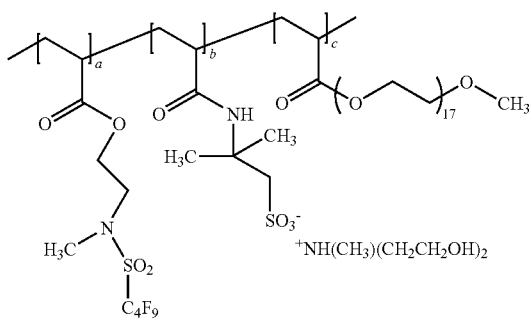

wherein the molar ratio of a:b:c is about 30:about 1:about 32 and wherein the molecular weight of the fluorosurfactant is about 1,000 to about 4,000 grams per mole, or wherein the fluorosurfactant has the structure

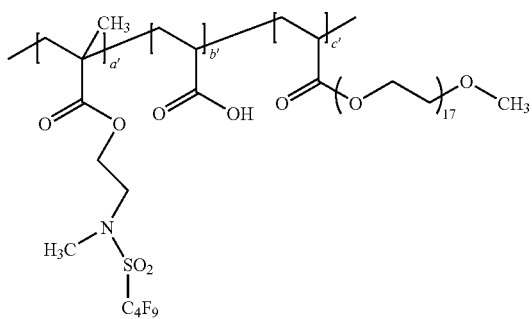

wherein the molar ratio of a':b':c' is about 3:about 3:about 1 and wherein the molecular weight of the fluorosurfactant is about 2,000 to about 40,000 grams per mole, or mixtures thereof.

6. A composition according to claim 1, wherein said organic solvent is an aliphatic alcohol, a ketone, an ester, an ether, an amide, or a mixture thereof.

7. A composition according to claim 1, wherein said organic solvent comprises a fluorinated organic solvent.

8. A composition according to claim 1, wherein $R_f$ in Formula (I) is of the formula:

$$-((R_f^3)_{q'}-R_f^2-O)_{z'}-R_f^1-(O-R_f^2-(R_f^3)_q)_z- \quad \text{(III)}$$

wherein $R_f^1$ is a perfluorinated alkyl or a perfluorinated alkylene group, $R_f^2$ is a perfluorinated polyalkyleneoxy group consisting of perfluorinated alkyleneoxy groups having 1, 2, 3 or 4 carbon atoms or a mixture of such perfluorinated alkyleneoxy groups; $R_f^3$ is a perfluorinated alkylene group or a substituted perfluorinated alkyl group; q and q' are independently chosen from 0 or 1; z is from 4 to 30, and z' is 0 to 30.

9. A composition according to claim 8, wherein $R_f^2$ comprises repeating units selected from the group consisting of —$(C_nF_{2n}O)$—, —$(CF(Z)O)$—, —$(C_nF_{2n}CF(Z)O)$—, and —$(CF_2CF(Z)O)$—, and combinations thereof, wherein n is at least 1 and wherein Z is a fluorine atom, a perfluoroalkyl group, a substituted perfluoroalkyl group, an oxygen-substituted perfluoroalkyl group, a perfluoroalkoxy group, or an oxygen-substituted perfluoroalkoxy group.

10. A composition according to claim 8, wherein $R_f^3$ comprises repeating units selected from the group consisting of —$(C_nF_{2n})$— and —$(CF(Z))$—, and combinations thereof, wherein n is at least 1 and wherein Z is a fluorine atom, a perfluoroalkyl group, a substituted perfluoroalkyl group, an oxygen-substituted perfluoroalkyl group, a perfluoroalkoxy group, or an oxygen-substituted perfluoroalkoxy group.

11. A composition according to claim 1, wherein $R_f$ is —$CF_2O(CF_2O)_m(C_2F_4O)_pCF_2$—, —$CF_2O(C_2F_4O)_pCF_2$—, $CF(CF_3)(OCF_2(CF_3)CF)_pO(CF_2)_mO(CF(CF_3)CF_2O)_pCF(CF_3)$—, $CF_3CF_2CF_2O(CF(CF_3)CF_2O)_pCF(CF_3)$—, or combinations thereof, where an average value for m and p is 0 to 50 and m and p are not independently 0.

12. A composition according to claim 1 wherein $R_f$ is $CF_3CF_2O(CF_2O)_m$—$(C_2F_4O)_pCF_2$—, $CF(CF_3)(OCF_2(CF_3)CF)_pO(CF_2)_mO(CF(CF_3)CF_2O)_pCF(CF_3)$—, $CF_3CF_2O(C_2F_4O)_pCF_2$—, $CF_3CF(CF_3)O$—$(CF(CF_3)CF_2O)_pCF(CF_3)$—, or combinations thereof, where an average value for m and p is 0 to 50 and m and p are not independently 0.

13. A method for treating a substrate comprising the step of applying a composition according to claim 1 to said substrate.

14. The method according to claim 13, wherein said method further comprises curing the applied composition at elevated temperature.

15. The method according to claim 13, wherein said substrate is a ceramic or a glass substrate.

16. The method according to claim 13, wherein the substrate is an antireflective surface, wherein said coating composition forms an antisoiling coating thereon.

17. A composition comprising:
(a) a perfluoropolyether urethane or urea silane or a mixture thereof comprising the reaction product of:
(i) a fluorinated polyether compound of the formula $$(T')_y\text{-}R_f\text{-}T \quad \text{(I)}$$

wherein $R_f$ is a monovalent or divalent polyfluoropolyether group; T and T' each independently represent —$CO_2R^3$, where $R^3$ is hydroxyalkyl, or —$C(O)N(R^1)(R^2)$, where $R^1$ is hydroxyalkyl, dihydroxypropyl, or polyalkylenepolyamine and $R^2$ is hydrogen or $R^1$; and y is 0 or 1; and (ii) a silane compound of the formula $$T''\text{-}Q''\text{-}SiY_{3-x}R'_x \quad \text{(II)}$$

wherein T" is —NCO; Q" is —$(C_nH_{2n})$—, where n is 2 to 6; R' is an alkyl group of 1-4 carbon atoms; Y is a $C_1$-$C_4$ alkoxy group, a halide, an acyloxy group, or a polyoxyalkylene group; and x is 0 or 1.

18. The composition according to claim 17 wherein T and T' each independently represent —C(O)N(R¹)(R²), where R¹ is hydroxyalkyl, dihydroxypropyl, or polyalkylenepolyamine, and R² is hydrogen.

19. The composition according to claim 17 wherein R¹ is hydroxyalkyl, dihydroxypropyl, or polyalkylenepolyamine, and R² is hydrogen.

20. An article having a surface, at least a portion of said surface having a coating thereon, said coating comprising a composition according to claim 17.

21. The article of claim 20 wherein said article is a ceramic or glass substrate.

* * * * *

UNITED STATES PATENT AND TRADEMARK OFFICE
CERTIFICATE OF CORRECTION

PATENT NO.       : 7,652,115 B2                                           Page 1 of 1
APPLICATION NO.  : 10/657644
DATED            : January 26, 2010
INVENTOR(S)      : Dams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 312 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO.         : 7,652,115 B2
APPLICATION NO.    : 10/657644
DATED              : January 26, 2010
INVENTOR(S)        : Rudolf Dams It is certified that error appears in the above-identified patent and that said Letters Patent is hereby corrected as shown below:

Column 1
Line 32, after "providing" insert -- an --.

Column 4
Line 17, after "linear" insert -- , --.

Column 7
Line 45, after "2001" insert -- , --.

Column 9
Line 14, after "%" delete "," and insert -- . --, therefor.

Column 12
Line 7 (glossary), delete "CH2" and insert -- $CH_2$ --, therefor.

Column 14
Line 25, after "Silane" delete ":" and insert -- ; --, therefor.

Column 15
Line 31, delete "HFPOSF" and insert -- HFPO-SF --, therefor.

Line 62, after "Chloropropylsilane" delete "," and insert -- ; --, therefor.

Column 16
Line 33, after "Aminopropylsilane" delete "/" and insert -- ; --, therefor.

Line 60, after "TEGME" delete "," and insert -- ; --, therefor.

Signed and Sealed this
Tenth Day of May, 2011

David J. Kappos
*Director of the United States Patent and Trademark Office*

Column 20

Line 54, in Claim 17, delete "Q"is" and insert -- Q" is --, therefor.